US008204061B1

(12) United States Patent
Sane et al.

(10) Patent No.: US 8,204,061 B1
(45) Date of Patent: Jun. 19, 2012

(54) VIRTUAL PORT CHANNEL SWITCHES WITH DISTRIBUTED CONTROL PLANES

(75) Inventors: Sanjay Sane, Fremont, CA (US); Smita Rai, Mountain View, CA (US); Pirabhu Raman, San Jose, CA (US); Umesh Mahajan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 12/460,719

(22) Filed: Jul. 23, 2009

(51) Int. Cl.
  *H04L 12/28* (2006.01)
  *H04L 12/56* (2006.01)
  *G06F 15/173* (2006.01)

(52) U.S. Cl. ......... 370/395; 370/351; 370/392; 709/223

(58) Field of Classification Search .......... 370/221–225, 370/235–256, 392–395, 401–463; 709/223–239
  See application file for complete search history.

(56) References Cited

U.S. PATENT DOCUMENTS

| 6,304,549 | B1 * | 10/2001 | Srinivasan et al. | 370/230 |
|---|---|---|---|---|
| 7,006,431 | B1 * | 2/2006 | Kanekar et al. | 370/217 |
| 7,173,934 | B2 * | 2/2007 | Lapuh et al. | 370/392 |
| 7,466,704 | B2 * | 12/2008 | Kalkunte et al. | 370/392 |
| 7,602,726 | B1 * | 10/2009 | Sundaresan et al. | 370/237 |
| 7,656,788 | B2 * | 2/2010 | Ma et al. | 370/219 |
| 7,751,416 | B2 * | 7/2010 | Smith et al. | 370/410 |
| 2004/0146062 | A1 * | 7/2004 | Parikh et al. | 370/419 |
| 2005/0063395 | A1 | 3/2005 | Smith et al. | |
| 2007/0005968 | A1 * | 1/2007 | Lu et al. | 713/168 |
| 2007/0183313 | A1 | 8/2007 | Narayanan et al. | |
| 2008/0181196 | A1 * | 7/2008 | Regan et al. | 370/351 |
| 2008/0275975 | A1 * | 11/2008 | Pandey et al. | 709/223 |

* cited by examiner

*Primary Examiner* — M. Phan
(74) *Attorney, Agent, or Firm* — Cindy Kaplan

(57) ABSTRACT

In one embodiment, an apparatus includes one or more ports for connection to one or more links in communication with a network device, a multi-chassis trunk (MCT) port for connection to an MCT in communication with a switch, and an MCEC manager for creating an MCEC comprising the one or more links in communication with the network device and one or more links connecting the switch to the network device, and transmitting messages to the switch to synchronize state for the MCEC. The apparatus further includes a control plane and a data plane configured for operation independent from a control plane and a data plane at the switch. A method is also disclosed.

18 Claims, 13 Drawing Sheets

US 8,204,061 B1

VIRTUAL PORT CHANNEL SWITCHES WITH DISTRIBUTED CONTROL PLANES

BACKGROUND OF THE INVENTION

The present disclosure relates generally to communication networks, and more particularly, to Virtual Port Channels (VPCs) configured at network devices.

High availability is a feature desired at each layer of a network design. Data centers often connect access switches to two aggregation switches to provide high availability features at the device and network level. Spanning Tree Protocol (STP) provides loop-free forwarding topology and high availability at the protocol level. STP operates to block the forwarding state of a redundant path during normal operation and provides fast switchover to the redundant path if a failure occurs in a primary path. However, STP limits traffic throughput in the case of server to server communications due to the blocking of alternate ports. The amount of server to server communication has recently increased for new data center applications. Thus, high bisectional bandwidth (Layer 2 multipathing) is an important feature along with high availability.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
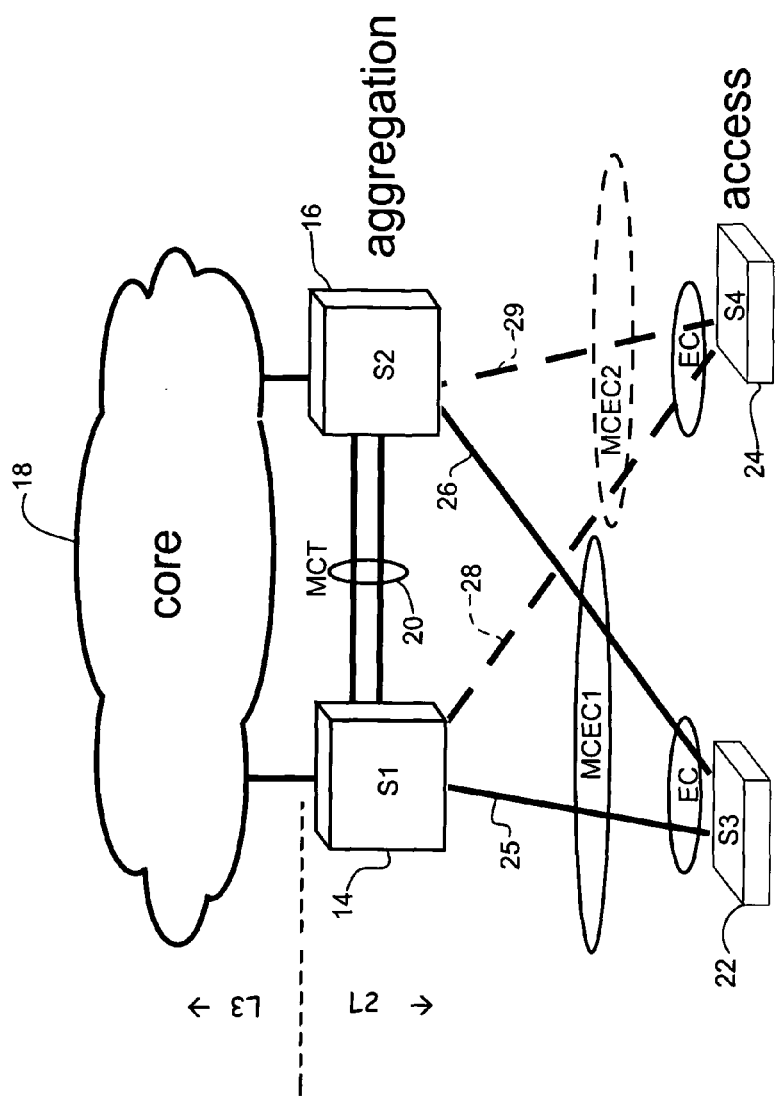
FIG. 1 illustrates an example of a network in which embodiments described herein may be implemented.

In one embodiment, a method generally comprises operating a first switch in communication with a second switch via a multi-chassis trunk (MCT), each of the first and second switches in communication with a network device via one or more links, and creating a Multi-Chassis EtherChannel (MCEC) comprising the one or more links connecting the first switch to the network device and the one or more links connecting the second switch to the network device. The method further includes transmitting a message from the first switch to the second switch to synchronize state for the MCEC. The first and second switches each comprise a control plane and a data plane operating independent from the control plane and the data plane at the other switch.

In another embodiment, an apparatus includes one or more ports for connection to one or more links in communication with a network device, a multi-chassis trunk (MCT) port for connection to an MCT in communication with a switch, and an MCEC manager for creating an MCEC comprising the one or more links in communication with the network device and one or more links connecting the switch to the network device, and transmitting messages to the switch to synchronize state for the MCEC. The apparatus further comprises a control plane and a data plane configured for operation independent from a control plane and a data plane at the switch.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, features relating to technical material that is known in the technical fields related to the invention have not been described in detail.

In conventional systems comprising redundant aggregation switches, Spanning Tree Protocol (STP) blocks the forwarding state of a redundant path in normal operation. Thus, the throughput for server to server communication is limited to a single aggregation switch. Adding more physical links to both aggregation switches would not result in an increase in network throughput due to the blocking of alternate ports by STP. One option to provide higher network bandwidth is to load-balance across VLANs (Virtual Local Area Networks). However, this does not provide true Layer 2 (L2) multipathing for intra-VLAN traffic since different flows cannot be load-balanced based on finer granularity of flow parameters. Also, this approach typically results in higher STP protocol configurations as well as computations, thereby exposing STP related inefficiencies.

Embodiments described herein enable links that are physically connected to different chassis to be viewed as a single EtherChannel. The embodiments provide high bisectional bandwidth (e.g., L2 multipathing) while providing high availability. As described in detail below, switches operate together to create a Multi-Chassis EtherChannel (MCEC) (also referred to herein as Virtual Port Channel (VPC)) and form a distributed control plane with a loosely coupled architecture. The embodiments provide load-balancing and chassis-level resiliency.

The embodiments described herein operate in the context of a data communication network including multiple network elements. Some of the elements in a network that employs the system may be network devices such as switches, routers, or hosts. The network device may include, for example, a master central processing unit (CPU), interfaces, and a bus. The CPU preferably includes memory and a processor. The network device may be implemented on a general purpose network machine such as described below with respect to FIG. 13.

FIG. 1 illustrates an example of a network that may implement embodiments described herein. The network may be configured for use as a data center or any other type of network. It is to be understood that the simplified network shown in FIG. 1 is only one example, and that the embodiments described herein may be employed in networks having different configurations and types of network devices.

The network shown in FIG. 1 includes two (first and second) aggregation switches (S1, S2) 14, 16 referred to herein as MCEC switches. The MCEC switches 14, 16 are in communication with a core network 18 (Layer 3 (L3) network). A multi-chassis trunk (MCT) (also referred to as peer-link) 20 connects the two peer MCEC switches 14, 16. The MCT 20 is a regular data link as far as control plane and data plane forwarding is concerned and is used for flooding and broadcast/multicast packets. The MCT 20 is also used for MCEC related control plane exchanges between the two MCEC switches 14, 16 (state and MAC synchronization, STP/IGMP handshake, MCEC manager and configuration message handshake, etc.). The MCT 20 also provides data traffic during failure scenarios (described below) and data traffic for asymmetrically connected hosts/switches. The MCT 20 operates as a regular STP link and all unknown unicast (broadcasts floods) traverse the link. As described below, STP ensures that this link does not get blocked as part of the forwarding topology.

The MCEC switches 14, 16 are also interconnected to two access switches (S3, S4) 22, 24. Access switch (first network device) 22 is connected to MCEC switches 14, 16 via a first set of links 25, 26, and access switch (second network device) 24 is connected to MCEC switches 14, 16 via a second set of links 28, 29. The access switches 22, 24 may be in communication with one or more network devices (e.g., host, server, switch, router) or another network (not shown).

As described in detail below, the MCEC switches 14, 16 cooperate with one another to form MCECs (VPCs).

EtherChannel (EC) (e.g., IEEE 802.3ad) aggregates multiple point-to-point physical ports into a single logical port to provide load-balancing of different flows across different physical links thereby achieving higher aggregate bandwidth and link level resiliency. Failure of one of the physical links has no effect on the logical link, as traffic continues to flow over the remaining physical links without any topology change. EtherChannel is transparent to network applications and users since they only see the one logical connection and have no knowledge of individual links. EtherChannel operates between two physical devices. Multi-Chassis EtherChannel (MCEC) enables links that are physically connected to different chassis to be viewed as a single EtherChannel. Thus, the physical links from the two switches 14, 16 can form a single logical EtherChannel referred to as MCEC (VPC). The multi-chassis aspect of the EtherChannel is known only to the cooperating MCEC switches 14, 16. From the viewpoint of the non-MCEC switches 22, 24, the channel looks like a conventional EtherChannel, even though the physical links are drawn towards different chassis. This allows an EtherChannel to be formed at each of the non-MCEC switches 22, 24 and MCECs to be formed at the MCEC switches 14, 16. As shown in FIG. 1, MCEC1 includes the physical links 25, 26 extending from MCEC switches 14 and 16 towards access switch 22. MCEC2 includes the physical links 28, 29 extending from MCEC switches 14, 16 towards access switch 24. The links 25, 26, 28, 29 thus connect the aggregate switches 14, 16 to the access switches 22, 24.

Operation of the MCEC is different than EtherChannel. For example, configuration handling of MCEC differs from regular port channels. Also, L2 control plane handling of the port channel is different as protocols/applications from both the MCEC chassis cooperate with each other to define the state of the single logical link. Each MCEC switch favors data plane forwarding only towards the local physical ports of the MCEC. Thus, forwarding on the MCT link (peer-link) is avoided if there are active physical links on a given chassis.

Figure 2:
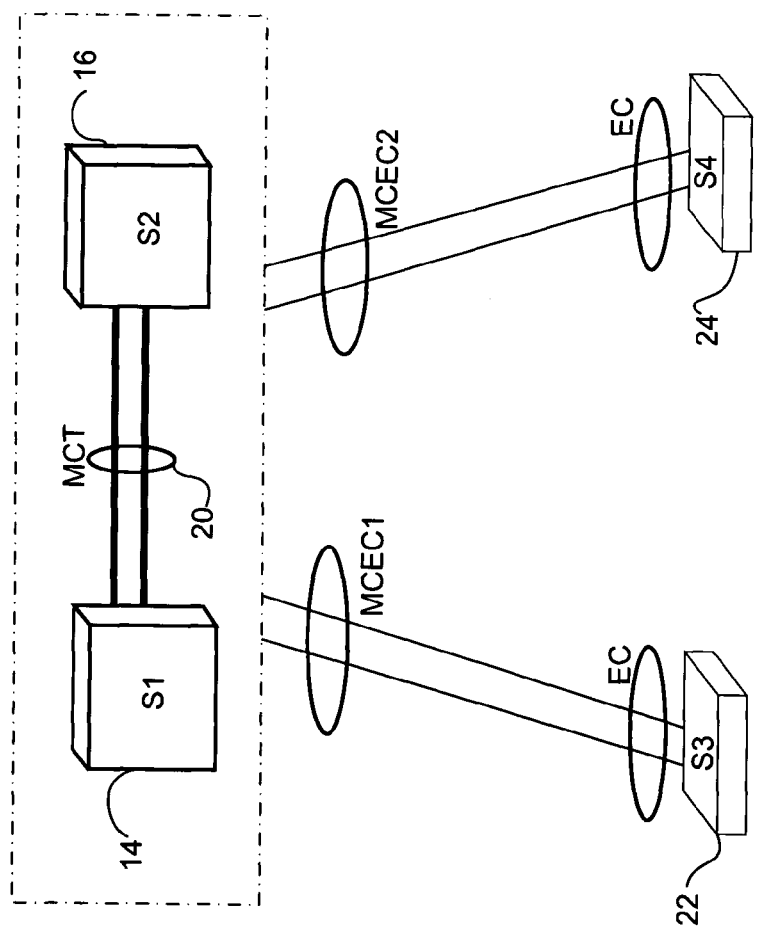
FIG. 2 illustrates a logical topology corresponding to the physical topology shown in FIG. 1.

The logical topology formed by MCEC switches 14, 16 is shown in FIG. 2. This topology doubles the total bisectional bandwidth between the access switches 22, 24 since all of the links between the access switches 22, 24 and aggregations switches 14, 16 are in forwarding mode and can be utilized by traffic flows that require server to server communication. Logical link-level resiliency is also achieved by extending EtherChannel fast link failover to the Multi-Chassis EtherChannel. Thus, high availability characteristics of the network design are fulfilled. The logical topology is a loop-free topology. This diminishes the role played by STP, and STP computations and configurations are kept to a minimum.

The MCEC is created through the association of the local port channel to an MCEC number on both of the MCEC switches 14, 16. Once the MCEC is created, the cooperation between the MCEC switches 14, 16 is lightly-coupled so that the switches do not place any dependencies on one another. The MCEC switches 14, 16 have a distributed architecture with respect to the following functionality: distributed control plane; distributed data plane; and distributed administration (management) plane. The control plane at each switch provides independent forwarding/control plane for each chassis. Each switch's control plane controls only its own local port state and local forwarding state. The forwarding state is built locally at each switch 14, 16 with cooperation between the two control planes to build MCEC state. Each switch 14, 16 also has its own administration plane so that management of the switches is independent from one another. Each MCEC switch 14, 16 thus understands and administers only their locally attached ports and cooperates to provide a single logical view to external devices. This distributed arrangement results in a loose coupling of the two MCEC peer switches while still operating to provide L2 multipathing.

The configurations for each MCEC switch 14, 16 are independent from one another. An administrator preferably makes configurations consistent on the peer MCEC switches. The administrator may be advised if the switches are inconsistently configured. If an inconsistent configuration causes network transient loops or may put a feature protocol into an unrecoverable state, an MCEC port is preferably placed in a logically suspended state.

In one embodiment, a domain ID is used to automatically form a virtual port channel system MAC address, which is used as a unique identifier for VPC related operations.

Figure 4:
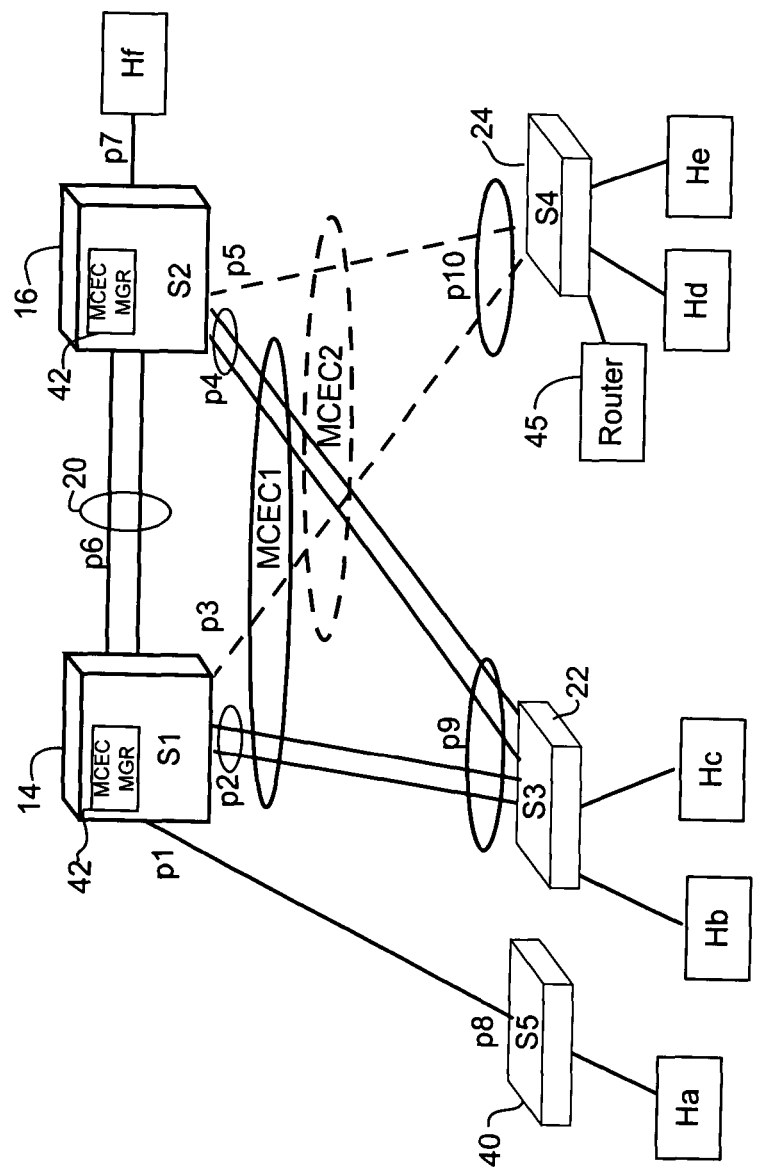
FIG. 4 illustrates an example of a network topology for use in describing packet flow.

Each MCEC switch 14, 16 includes an MCEC manager (MCEC MGR) 42 (FIG. 4). The MCEC manager 42 provides repository of MCEC configuration and running status, participates in port bringup sequence of MCT as well as MCEC, exchanges configuration information between MCEC switches, establishes peer link adjacency (enabling common VPC transport layer), and runs a heartbeat mechanism that checks communication between the two MCEC switches and ensures correct state for MCEC links. The MCEC manager also provides hardware state management and coordination with the peer switch to export VPC related databases. The MCEC manager 42 may also provide compatibility checks and run sequences to initiate various failure conditions (described below). In one embodiment, the MCEC manager 42 provides software based MAC synchronization between the MCEC switches.

Figure 3A:
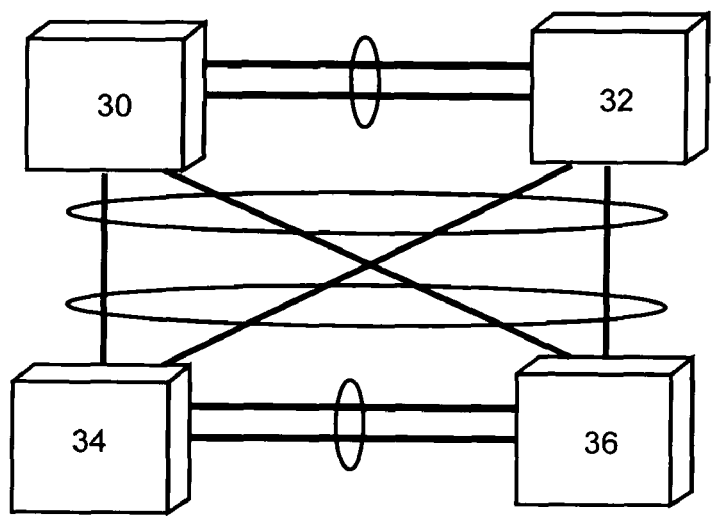
FIGS. 3a and 3b illustrate the physical and logical topology for a double-sided MCEC deployment.
Figure 3B:
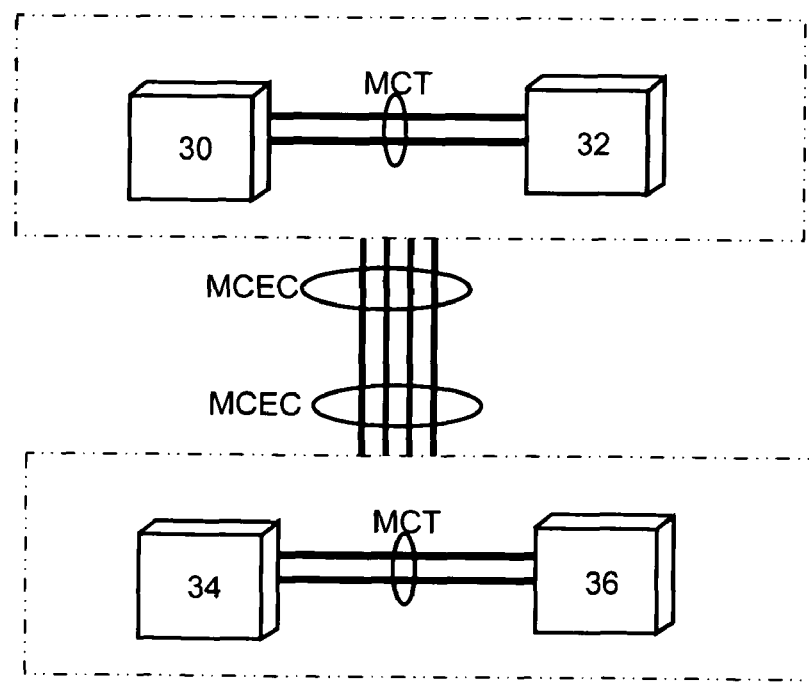

As illustrated in FIGS. 3a and 3b, two peer MCEC switches 30, 32 can form an MCEC with another set of MCEC switches 34, 36. The physical topology is shown in FIG. 3a and the corresponding logical topology is shown in FIG. 3b.

The example shown in FIGS. 3a and 3b may be used in a three tier L2 topology comprising two or more tiers of aggregation switches in a hierarchical arrangement, for example. The embodiments described herein may also be used in a two tier access-aggregation topology comprising three or more access switches. The MCEC switch may also have non-MCEC links. It is to be understood that the topologies shown and described herein are only examples and that the embodiments may be used in many other topologies.

The following describes round-trip flow for a unicast packet with reference to FIG. 4. MCEC switch 14 (S1) is in communication with MCEC switch 16 (S2) via MCT 20 and access switches 22 (S3), 24 (S4), and 40 (S5). Switch 16 (S2) is in communication with MCEC switch 14 (S1) and access switches 22 (S3) and 24 (S4). Switch S5 is connected to host Ha, switch S3 is connected to hosts Hb and Hc, switch S4 is connected to hosts Hd and He, and switch S2 is connected to host Hf. Link IDs (port-indices) are shown in FIG. 4 for S1 (p1, p2, p3, p6), S2 (p4, p5, p6, p7), S3 (p9), S4 (p10), and S5 (p8). The MCEC number space is shared across the MCEC switches. MCEC1 is configured on port channels p2 and p4 and MCEC2 is configured on port channels p3 and p5 at switches S1 and S2. Individual STP instances run on each of the MCEC switches 51, S2 and cooperate to form a loop-free topology. All links are in forwarding state.

The L2 MAC tables are initially empty. The following describes a round-trip flow between host Hb and destination Hd.

Host Hb sends a packet to switch S3, with a destination of host Hd. Switch S3 treats this as an unknown unicast flood. Switch S3 has only one active link p9 (regular EtherChannel) as part of its STP topology. Switch S3 floods the packet on link p9. Physically, based on EtherChannel load-balancing algorithm, the packet can be sent out on one of the four physical ports. In this example, one of the links going towards switch S1 is chosen. Switch S1 receives the packet from p2, with unknown destination host Hd and floods the packet to other links of its STP topology (links p1, p3, and p6). Switch S1 learns the source address of host Hb on link p2. It also triggers a software MAC update so that a software MAC synchronization packet is sent to switch S2 (its peer MCEC switch), indicating that host Hb was learned from MCEC1.

Switch S2 receives the software MAC synchronization packet from switch S1 and programs its MAC table. Host Hb is programmed off link p4, which is the local link on switch S2 corresponding to MCEC1. The unknown unicast flooded packet from switch S1 also reaches switch S2. Switch S2's STP topology consists of links p4, p5, p6, and p7. However, since the packet was received on the MCT link, it forwards the packet only on non-MCEC links. Switch S2 thus floods the packet only onto link p7. It is assumed that a packet coming from MCT has already been delivered to the local MCEC ports by the peer MCEC switch 14, thus packet duplication is avoided. Hardware may be used to mark all packets coming from the MCT, and to drop packets going out of MCEC links if the packets carry such a mark.

The unknown unicast flooded packet from switch S1 also reaches switch S4 via p3, which learns the source MAC address host Hb on its link p10 (which is a single logical EtherChannel link). The packet goes out towards host Hd and host Hd responds to host Hb.

Switch S4 has already learned host Hb on its link p10 and sends out a directed known unicast. Physically, based on the EtherChannel load-balancing algorithm, the packet could be sent out on one of the two physical ports. In this example, the packet is sent out on the link connected to (i.e., going towards) switch S2. Switch S2 receives the packet from host Hd and destined for host Hb. Switch S2 learns the source MAC address on link p5 and sends a MAC synchronization update towards switch S1. It should be noted that the data plane at switch S2 prefers only the local MCEC link for forwarding packets. Although the MCEC consists of multiple links spanning switch S2 and switch S1, only local MCEC links are preferred by data plane forwarding.

Via an earlier MAC synchronization update, switch S2 has already updated its MAC table for host Hb to point towards link p4. Thus, this is a known unicast packet and will go out of link p4 towards switch S3. Switch S3 receives the packet on p9 and sends the packet towards host Hb.

All of the MAC addresses are synchronized to the peer MCEC switch. Some MAC addresses are learned from MCEC ports (e.g., for hosts Hb, Hc, Hd, and He) and others may be singly connected (e.g., hosts Ha and Hf). For example, via MAC synchronization update, switch S2 receives host Hb as connected to MCEC1. Thus, it puts the hardware entry for host Hb to prefer its local link p4 of MCEC1. In cases where MAC update is not for a MCEC link, switch S2 directs the MAC towards the MCT link. For example, switch S1 may send a MAC synchronization update for host Ha towards switch S2, in which case switch S2 would learn host Ha from its MCT link p6.

In the above example, the embodiments allow all of the links between switch S3 and switches S1 and S2 to be utilized. The MAC tables remain in sync on both the MCEC switches. MAC aging preferably also occurs in a synchronized fashion.

The following describes multicast flow with reference to FIG. 4. The multicast control plane (IGMP snooping) is also described as part of this flow. In this example, host Hb is interested in group G1 and a router 45 is behind switch S4. The following describes how host Hb is added to group G1 and how G1 multicast packets reach host Hb.

Host Hb first sends an IGMP report to switch S3. Switch S3 sends IGMP report towards the router ports. Router port is towards link p9, hence IGMP report is sent to p9. In this example, the load balancing algorithm picks the path towards switch S1. Switch S1 puts link p2 on its oif-list (outgoing interface list) for group G1 and forwards the IGMP report towards the router port. For switch S1, the router port is p3, which leads towards switch S4. Switch S1 also forwards a software IGMP synchronization message to its peer MCEC switch 16. This message includes the original IGMP report and MCEC port number. In this example, the software message includes MCEC1. Once switch S2 receives the IGMP software update, it updates its multicast forwarding state (oif-list) for group G1. Since the update came from switch S1's MCEC1 port, it includes the local port p4 (after translating MCEC1->p4) as part of the oif-list.

Switch S2 acts on the software IGMP synchronization message similar to its IGMP snooping functionality. Thus, as part of IGMP snooping function, it may also need to forward the IGMP report towards the router port. However, in this particular case, since the software IGMP message came in on the MCT link and because the router port is behind the MCEC link, it assumes that the peer MCEC switch has already forwarded the IGMP report towards the MCEC link. Thus, forwarding of duplicate IGMP reports is avoided. If there were other router ports beside the MCEC ports, switch S2 would have forwarded the reports to those router ports. The above description illustrates the distributed control plane for multicast IGMP snooping.

If host Hf sources multicast packets for group G1, switch S2's oif-list for group G1 includes its local port p4 that leads towards host Hb, as well as port p5 that leads towards switch S4 and the router 45. If host Ha is also interested in group G1, switch S2 adds the MCT as part of its oif-list.

Forwarding of IGMP protocol packets is configured so that IGMP reports received at one MCEC switch are also forwarded to its peer MCEC switch. Thus, multicast forwarding state remains in sync on both of the MCEC switches. Multicast forwarding also prefers the local MCEC ports as part of forwarding.

Figure 5:
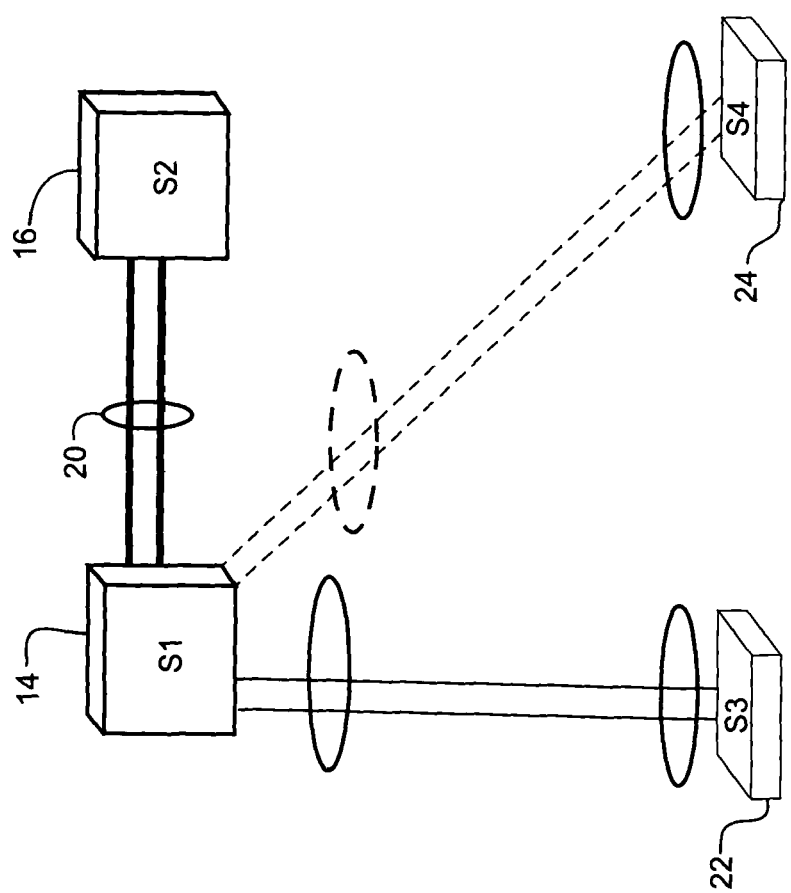
FIG. 5 illustrates a logical Spanning Tree Protocol (STP) topology.

FIG. 5 illustrates a logical STP topology for the network shown in FIG. 1. Individual STP instances are run on each MCEC switch 14, 16, however, MCEC port is evaluated only in one of the STP instances. One of the two MCEC switches is designated to be a master switch and the other is designated as a slave switch. The master switch sees and acts on the MCEC port. In the example shown in FIG. 5, switch 14 is designated as the master switch. Thus, only the STP instance at switch 14 handles MCEC logical port state. The MCT link 20 is treated as a special link which is not allowed to be blocked. The number of BPDUs processed is proportional to the number of logical MCEC links. Thus, in comparison to a conventional system, the number of BPDUs is reduced by half in the embodiments described herein.

Receipt of BPDU is supported from any of the links of the MCEC (i.e., master switch's STP instance may receive BPDU from slave switch). Transmittal of BPDUs is also supported on any of the links of the MCEC. The master switch may prefer its directly connected MCEC link to transmit on the MCEC. However, if the local MCEC link is not active, but the slave switch's MCEC link is active, BPDUs are sent on the slave switch's link. If BPDUs are not received over the MCT link 20, it is considered a failure condition similar to MCT failure (described below) and appropriate action is taken.

The following describes operation during various failure conditions. Examples are provided for a single link failure within an MCEC, failure of all MCEC links at one of the MCEC switches, single link failure of MCT, and failure of all links of the MCT.

Figure 6:
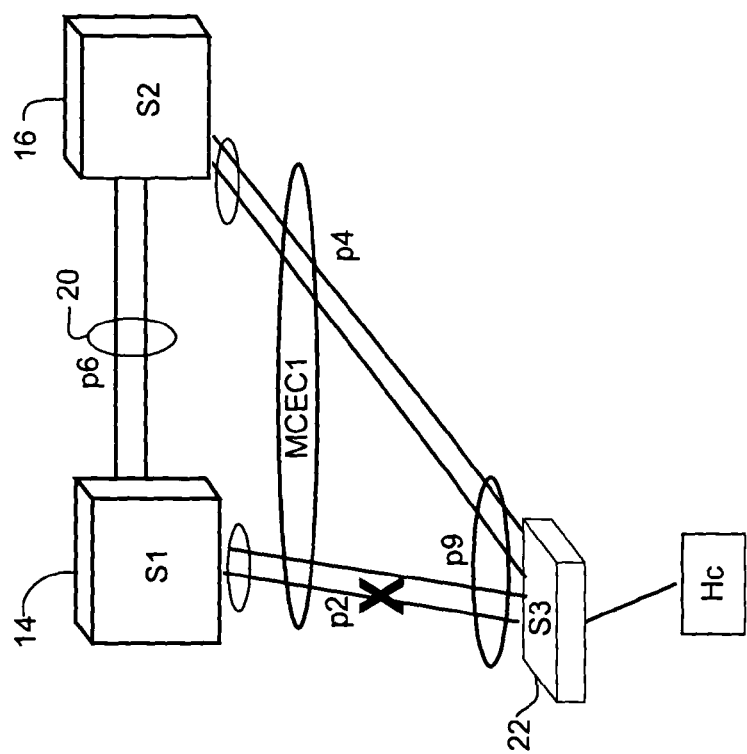
FIG. 6 illustrates a failure of a Multi-Chassis EtherChannel (MCEC) link.

FIG. 6 illustrates a failure in one link within MCEC1 for MCEC switch 14. Each MCEC switch 14, 16 sees a logical port channel, which is also configured to be a MCEC. For example, switch 14 is configured with port channel p2, which is also flagged as MCEC1. If one of the links within p2 fails, then recovery is preferably handled by conventional recovery mechanisms of EtherChannel. Thus, if EtherChannel is statically configured, a port down event is triggered. If EtherChannel has a protocol configured on it (e.g. LACP (Link Aggregation Control Protocol)), the detection of link failure is very fast. In either of these cases, EtherChannel load-balancing is adjusted so that it does not consider the failed link as one of the active links of the port channel. Similar processing occurs on switch 22. This failure does not result in a change in the logical topology or any change to STP processing.

Figure 7:
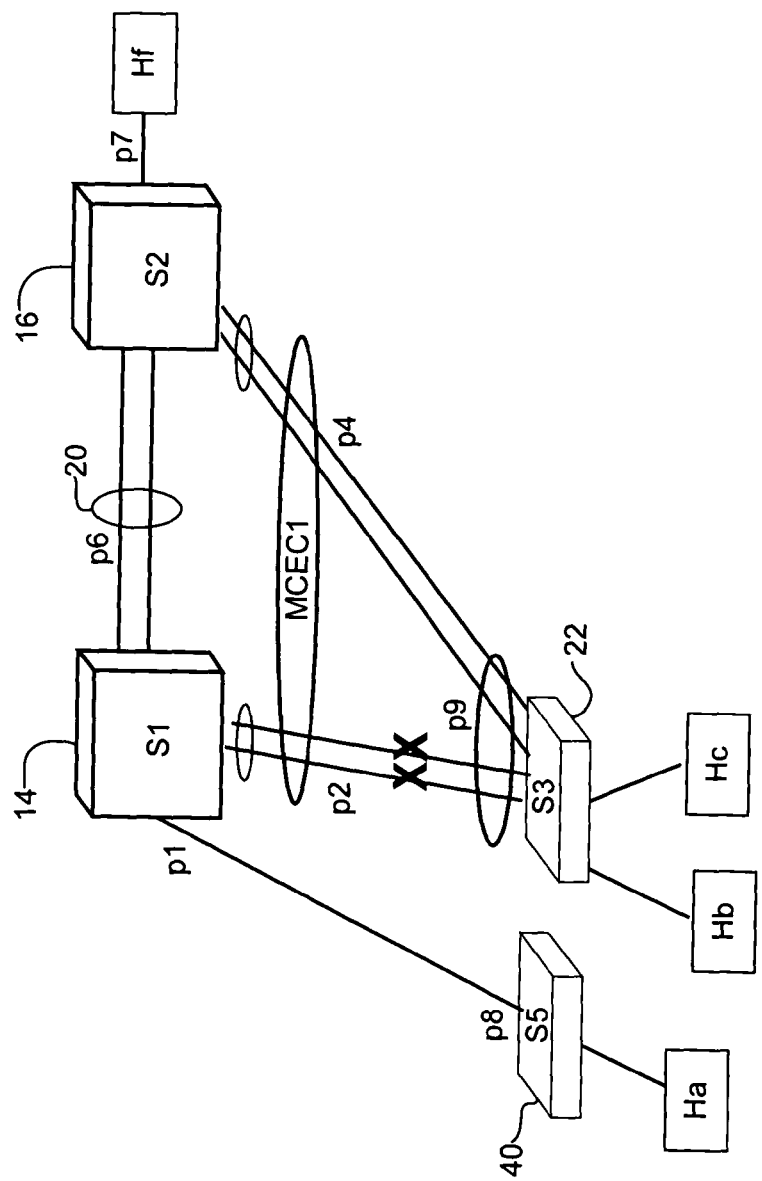
FIG. 7 illustrates a failure of all MCEC links at an MCEC switch.

FIG. 7 illustrates an example in which all links of MCEC1 at switch S1 fail. As part of the MCEC processing, the MAC address table of switches S1 and S2 remain synchronized. All packets with MAC addresses destined towards MCEC1 are initially programmed in the hardware MAC table to choose the local MCEC links. For example, in switch S1, MAC for host Hc has been programmed to go to p2 and on switch S2, MAC for host Hc has been programmed to go to p4. In the event that all of the local MCEC links of switch S1 fail, the control plane still treats this as a failure of some links within the bigger Multi-Chassis EtherChannel. No changes to the logical topology or STP computations are made. The logical state of MCEC1 does not change. As per data plane in switch S1, all of the MAC addresses that are learned off of MCEC1 are marked to be delivered over the MCT link 20. Thus, packets arriving from host Ha into switch S1 and destined towards host Hc will traverse the MCT link. Once the packets enter switch S2, the usual lookup results in delivery of the packets on switch S2's local MCEC link (p4). Thus, during this failure condition, usage of the MCT link 20 will be increased to carry traffic destined towards the hosts behind MCEC1.

In switch S1, MAC for host Hc is still looked up and delivered to p2. The port channel membership of p2 is internally changed so that all physical members of MCT link (p6) are mapped to the physical members of the port channel p2. Once switch S1 detects that all local MCEC links (p2) are failed, it triggers a software message to switch S2. Upon receiving this message, switch S2 removes drop bits (e.g., VSL drop bits) on its local MCEC links that correspond to MCEC1 (i.e., p4). The VSL drop bits play a role in allowing packets to egress if they have arrived through the MCT link. Thus, in this case, even though the packets from switch S1 are arriving in switch S2 over the MCT link (and thus get marked with VSL bit), they are not dropped but instead allowed to egress out of the MCEC link p4.

Figure 8:
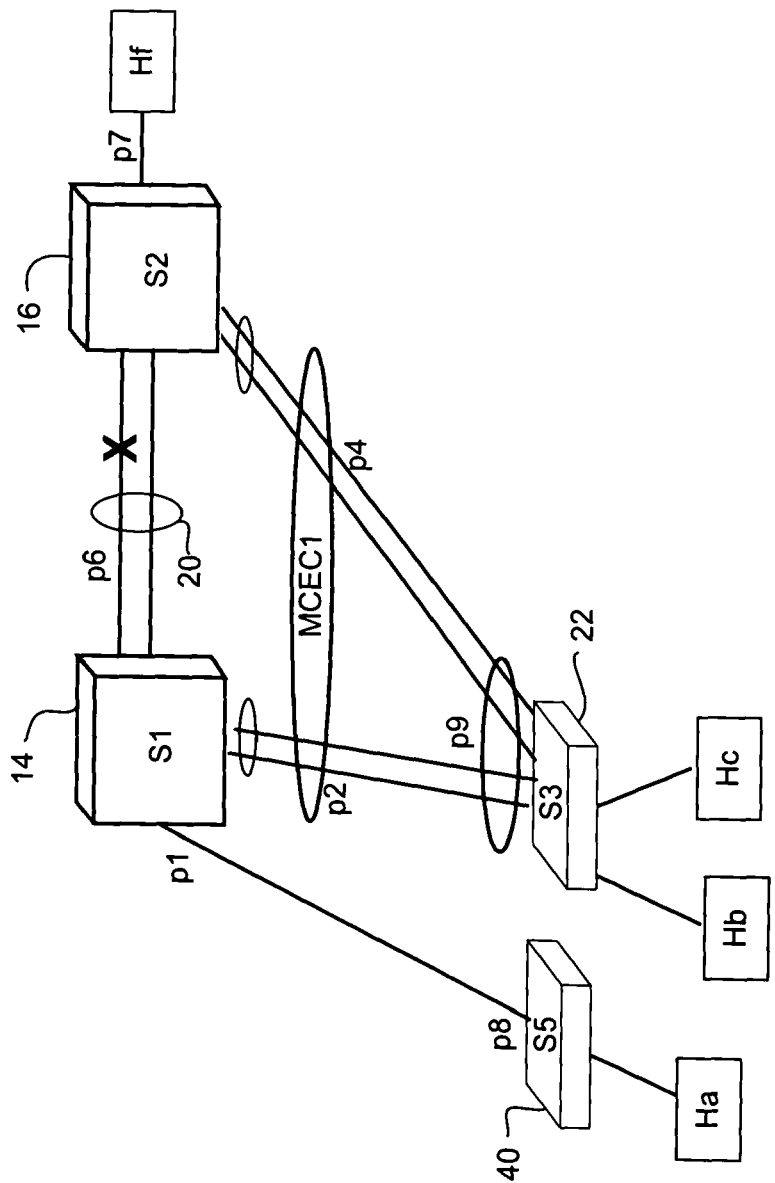
FIG. 8 illustrates a single link failure of a Multi-Chassis Trunk (MCT).

FIG. 8 illustrates a single link failure of MCT 20. This is a normal EtherChannel member link failure operation. The load-balancing algorithm is adjusted to reflect the failed link. The load on the remaining MCT links may increase rapidly upon a link failure. The MCT links should therefore be provisioned with failure scenarios in mind and quick replacement for the failed link. In one embodiment, software flags the MCT link failure events with a higher severity to alert the administrator of this issue.

Figure 9:
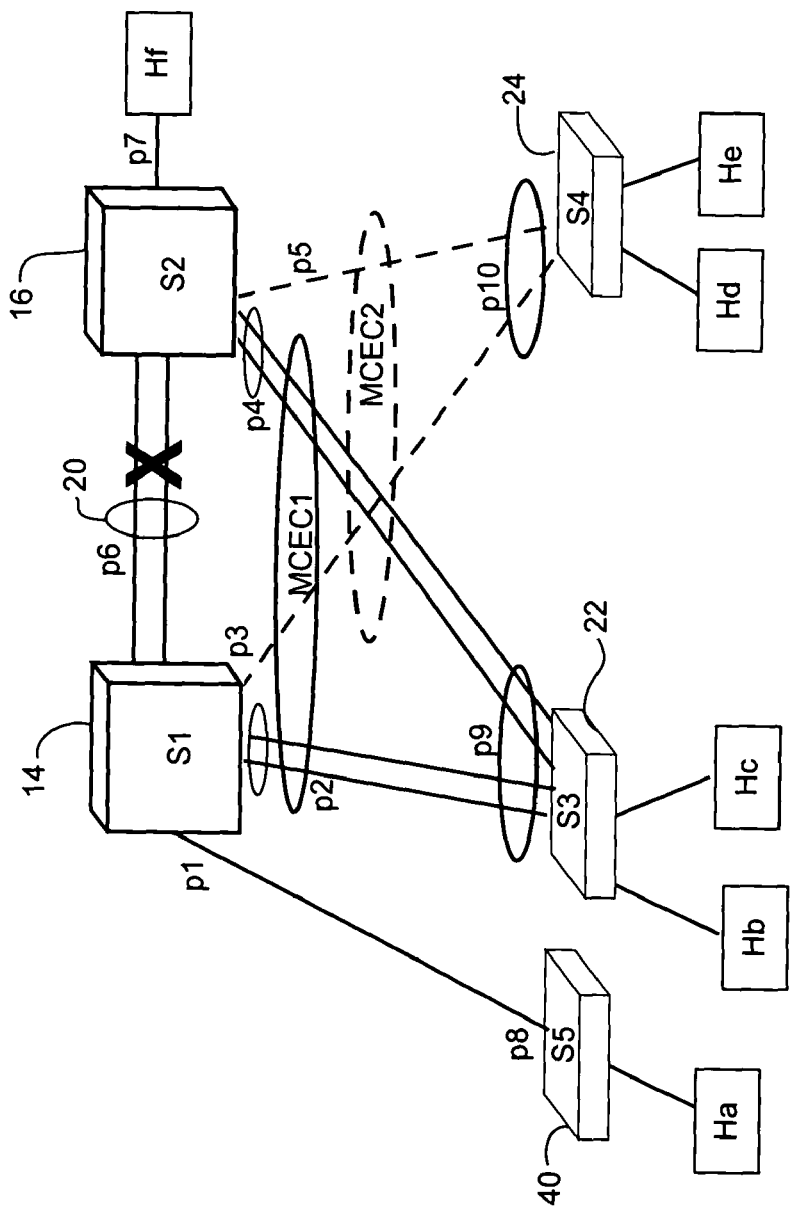
FIG. 9 illustrates a failure of all links of the MCT.

FIG. 9 illustrates failure of all links of the MCT 20. Due to the criticality of the MCT, it is preferably provisioned to have multiple links as part of the EtherChannel. MCEC (VPC) manager 42 also has a heartbeat exchange mechanism over another logical path between the two VPC peer switches. MCEC related functionality relies on this heartbeat mechanism for proper functioning of the MCEC when the peer-link (MCT) 20 goes down.

In the case of an MCT failure, one switch operates as a master and the other a slave. These roles may be assigned when the MCEC switch adjacency is established for the first time, for example. During the MCT link failure event, the master switch does not take any action. The slave switch brings all of its MCEC links down if it detects master switch alive through the heartbeat exchange, thereby reducing the MCEC to constitute only the members of the master switch. Shut down of the ports causes an EtherChannel member link failure on the downstream non-MCEC switches S3 and S4. These switches re-balance the EtherChannel traffic only to the link towards the master switch. In this example, switch S1 has the role of master and switch S2 is the slave. In the event of an MCT failure, switch S2 shuts down its ports p4 and p5. Thus, MCEC is now active for only the MCEC links of switch S1 (p2, p3).

This operation maintains resiliency of the Multi-Chassis EtherChannel and does not introduce transient loops or cause instability in the forwarding topology. STP computations are also kept to a minimum. The EtherChannel traffic is quickly allowed to use the remaining links. However, in the case of a master switch failure, the above approach would result in loss of all of the MCEC links.

Figure 10:
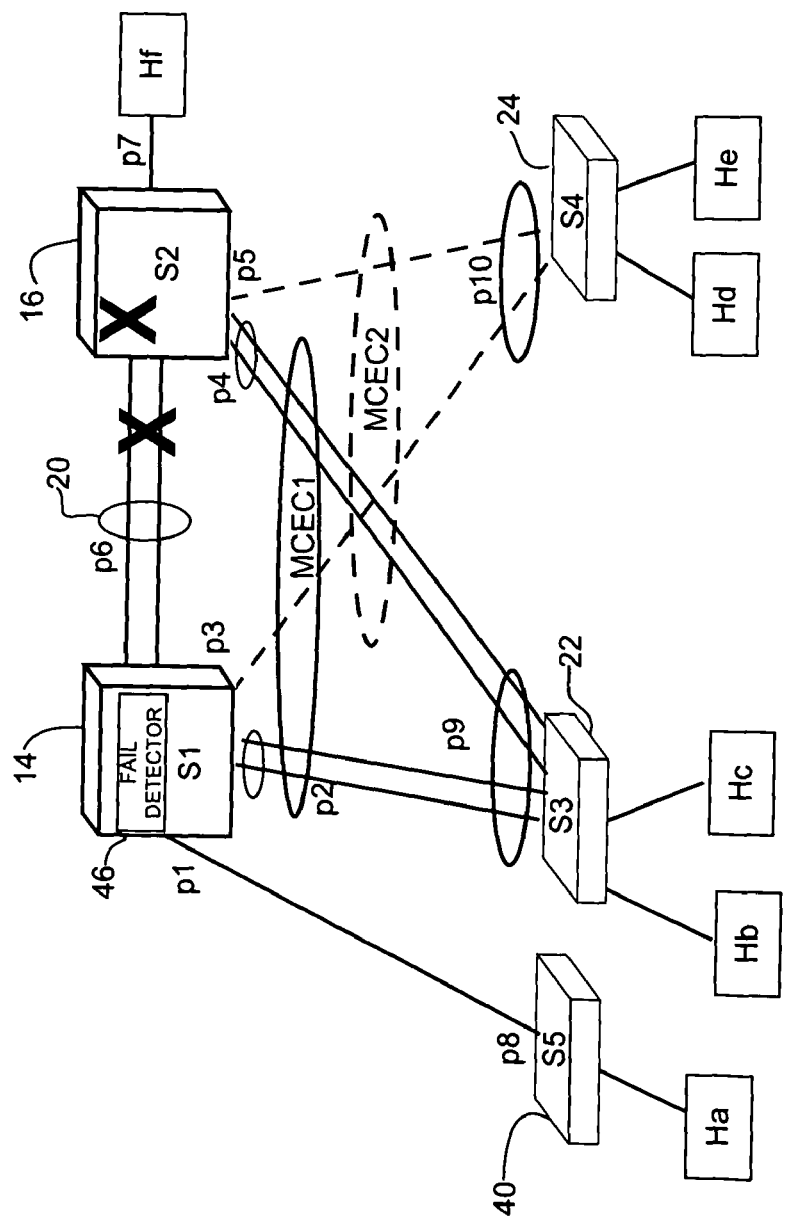
FIG. 10 illustrates a switch and MCT failure.

In one embodiment, a detection mechanism (fail detector) 46 provides a heartbeat exchange to determine if the MCT link (peer-link) 20 is down and peer switch is alive or MCT link is down and peer switch has failed (FIG. 10). The detection mechanism 46 cannot rely on the MCT link 20 being up. In one embodiment, an alternate path is provided for the heartbeat/keepalive messages. The alternate path may be a direct link between the two MCEC switches that is used only for sending heartbeat messages. Reachability of the peer MCEC switch may also be determined via (out-of-band) management network. Another option is the use of LACP extensions so that non-MCEC switches can convey whether the MCEC switches are alive.

If the detection mechanism 46 on the slave switch determines that the master switch is alive, the same action as described above is taken. If the detection mechanism 46 suggests that the MCT 20 has failed and peer MCEC switch has also failed (FIG. 10), then the available links need to remain in a usable state. If the master switch has failed, the slave switch maintains its MCEC links active.

Figure 11:
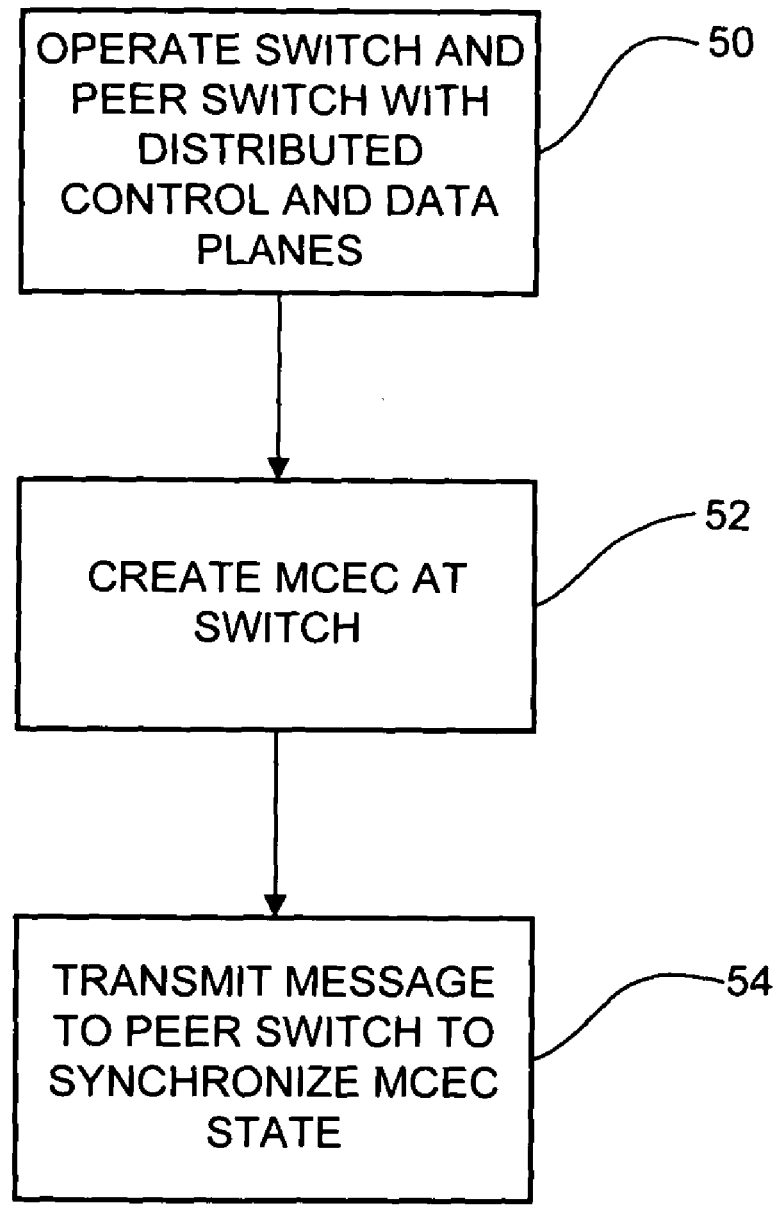
FIG. 11 is a flowchart illustrating a process for creating and utilizing MCEC.

FIG. 11 is a flowchart illustrating an overview of a process for creating and utilizing a Multi-Chassis EtherChannel (Virtual Port Channel) at a switch. As shown in FIG. 1, a first MCEC switch 14 is in communication with a second MCEC switch 16 via a multi-chassis trunk (peer-link) and both of these MCEC switches 14, 16 are interconnected via links with a plurality of access switches 22, 24. The MCEC switches 14, 16 operate with distributed control planes and data planes so that the control plane and data plane at each switch operate independent from the control plane and data plane at the other switch (step 50). At step 52, the switch forms the MCEC comprising one or more of the links connecting the first MCEC switch to one of the access switches and one or more of the links connecting the second MCEC switch to the same access switch. The peer switches transmit messages to synchronize state for the MCEC (step 54).

Figure 12:
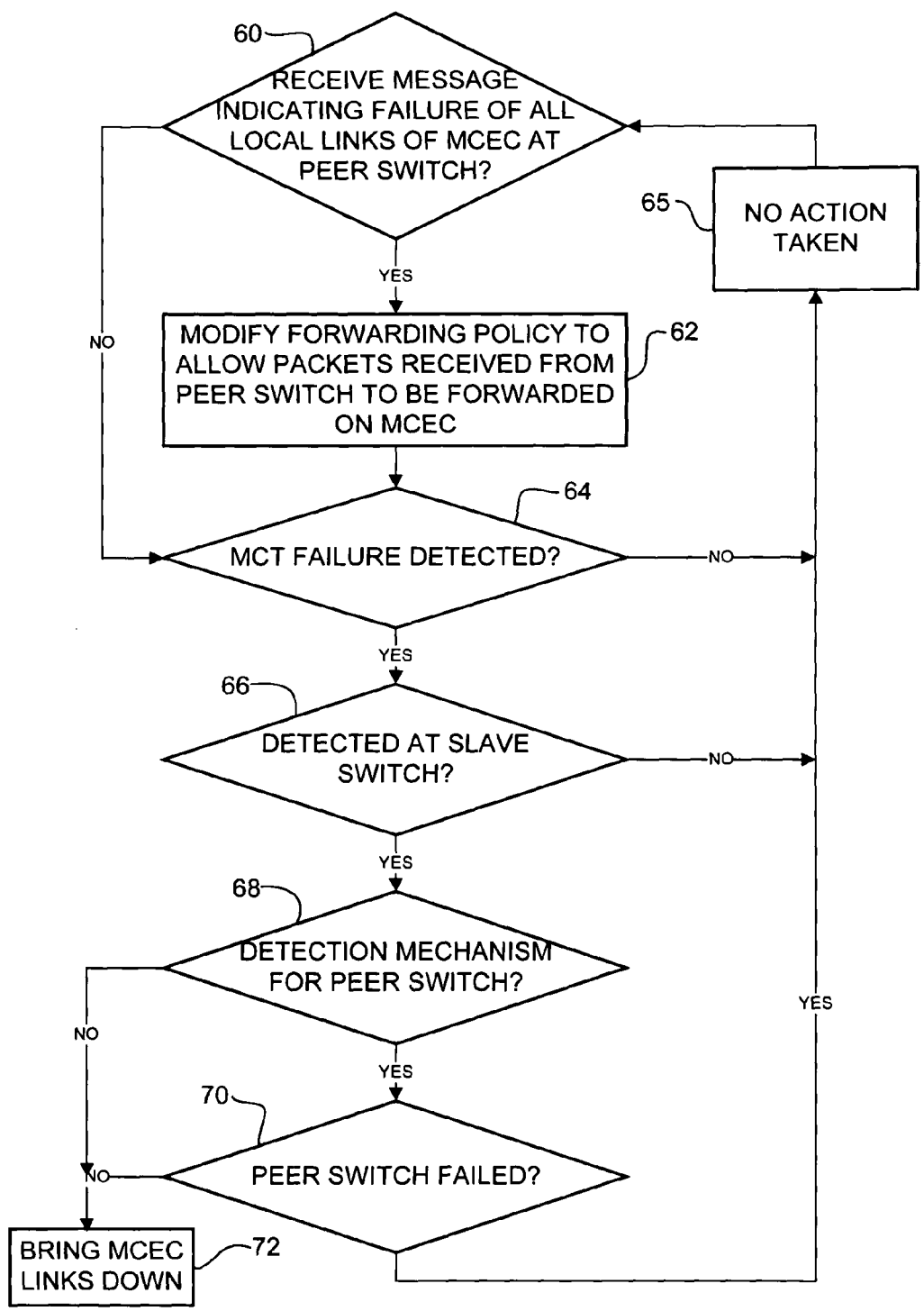
FIG. 12 is a flowchart illustrating a process for operating MCEC switches following a failure.

FIG. 12 is a flowchart illustrating a process for handling failures in all MCEC links at a switch or a failure in all links of the MCT. If an MCEC switch detects that all local links of an MCEC have failed, the switch transmits a message over the MCT to its peer MCEC switch informing it of the failure. The switch also changes the port channel membership for the MCEC with the failed links so that all physical members of the MCEC link will be mapped to the physical members of the MCT link. Thus, instead of forwarding packets onto the failed links of the MCEC, the switch will forward packets to its peer switch. The MCEC peer switch receiving the message modifies its forwarding policy so that packets received from its peer switch over the MCT are forwarded out of the operating MCEC links, rather than dropped (steps 60 and 62).

If a MCT failure is detected at the MCEC switch, the switch will check to see if it is designated as a master or slave (steps 64 and 66). If the switch is a master switch, no action is taken (step 65). If the switch is a slave switch and no detection mechanism is available to determine if the peer switch is operational (step 68), the slave switch will bring down all of its MCEC links (step 72). If a detection mechanism is available and the peer node is operating, the slave switch will bring all of its MCEC links down (steps 70 and 72). If the peer node is not operating, the slave switch will keep its MCEC links active (steps 70 and 65).

It is to be understood that the processes illustrated in FIGS. 11 and 12 are provided as examples and that steps may be added or deleted, or the order of steps may be changed, without departing from the scope of the invention.

Figure 13:
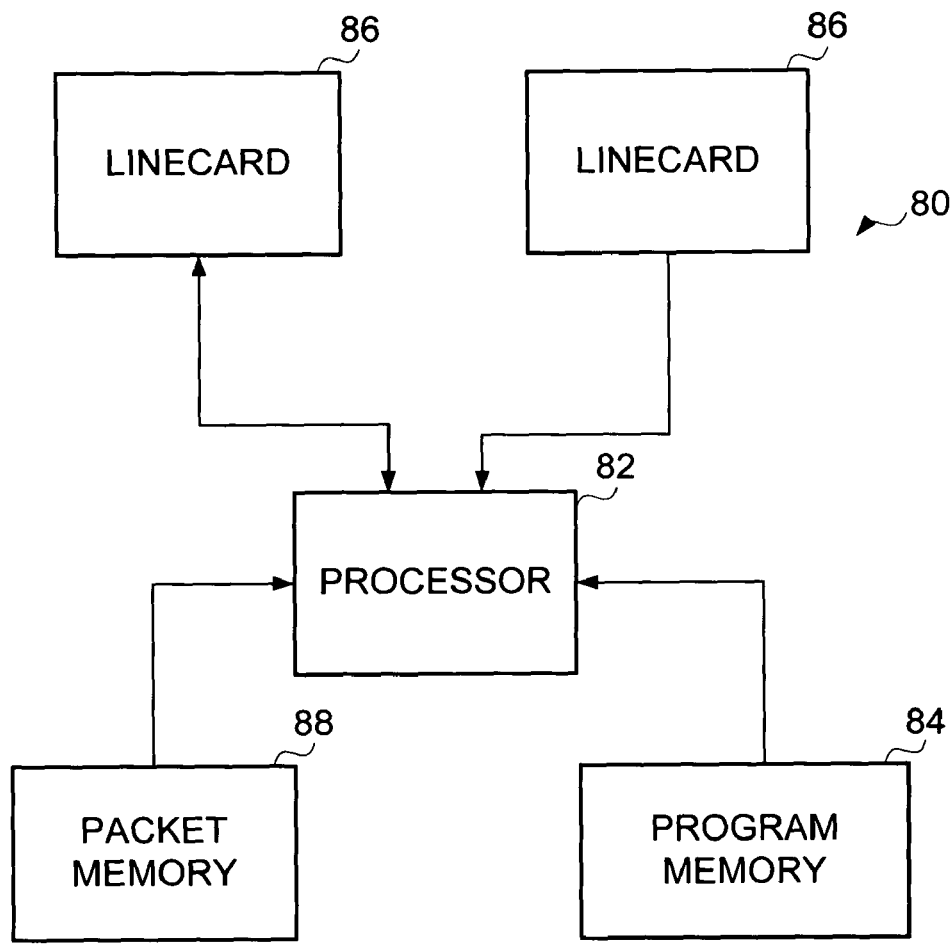
FIG. 13 depicts an example of a network device useful in implementing embodiments described herein.

FIG. 13 depicts a network device 80 that may be used to implement embodiments described herein. Network device 80 is configured to implement all of the network protocols and extensions thereof described above. In one embodiment, network device 80 is a programmable machine that may be implemented in hardware, software, or any combination thereof. Logic may be encoded in one or more tangible media for execution by a processor. For example, processor 82 may execute codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 13 and described above is only one example and that different configurations of network devices may be used.

As can be observed from the foregoing, the embodiments described herein provide numerous advantages. For example, Layer 2 multipathing is provided while maintaining high-availability and reduced dependence on STP and its configuration complexities. The system is highly resilient and can scale to performance limits of each modular chassis. Also, the system does not require any special port type, extra headers/encapsulation, or special VLANs.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   operating a first switch in communication with a second switch via a multi-chassis trunk (MCT), each of said first and second switches in communication with a first network device via one or more links and a second network device via another one or more links;
   creating a first Multi-Chassis EtherChannel (MCEC) comprising the one or more links connecting said first switch to the first network device and the one or more links connecting said second switch to the first network device;
   creating a second MCEC comprising the one or more link connecting said first switch to the second network device and the one or more links connecting said second switch to the second network device; and
   transmitting a message from said first switch to said second switch to synchronize state for said first MCEC;
   wherein said first and second switches each comprise a control plane and a data plane operating independent from the control plane and the data plane at said other switch.

2. The method of claim 1 wherein said first and second switches comprise aggregation switches and the first and second network devices comprise access switches.

3. The method of claim 1 further comprising forwarding all packets received at a port of said first switch not connected to the MCT and destined for a host connected to the first network device on one of the links of said first MCEC at said first switch.

4. The method of claim 1 further comprising receiving packets from the MCT at said first switch and transmitting the received packets only on links that are not in said first MCEC.

5. The method of claim 4 further comprising receiving a message from said second switch indicating that all of the links of said first MCEC at said second switch have failed and allowing packets received from the MCT to be forwarded on the links of said first MCEC at said first switch.

6. The method of claim 1 wherein said first and second switches comprise a distributed management plane.

7. The method of claim 1 wherein transmitting said message comprises transmitting MCEC control plane information on the MCT.

8. The method of claim 1 further comprising preventing blocking of a port connected to the MCT at said first switch during Spanning Tree Protocol (STP) operations.

9. The method of claim 1 wherein one of said first and second switches is designated a master switch and the other of said switches is designated a slave switch and further comprising evaluating said first MCEC in a Spanning Tree Protocol (STP) instance only at the master switch.

10. The method of claim 1 wherein one of said first and second switches is designated a master switch and the other of said switches is designated a slave switch and further comprising detecting failure of said MCT at said first switch and bringing down all of the links of said first MCEC at said first switch only if said first switch is a slave switch.

11. The method of claim 10 further comprising receiving indication of a failure at said second switch and leaving all of the links of said first MCEC active even if said first switch is a slave switch.

12. An apparatus comprising:
a plurality of ports for connection to one or more links in communication with a first network device and one or more links in communication with a second network device;
a multi-chassis trunk (MCT) port for connection to an MCT in communication with a switch;
a Multi-Chassis EtherChannel (MCEC) manager for creating a first MCEC comprising the one or more links in communication with the first network device and one or more links connecting the switch to the first network device, creating a second MCEC comprising the one or more links in communication with the second network device and one or more links connecting the switch to the second network device, and transmitting messages to the switch to synchronize state for said first MCEC; and
a control plane and a data plane configured for operation independent from a control plane and a data plane at the switch.

13. The apparatus of claim 12 wherein the apparatus is an aggregation switch and the first and second network devices comprise access switches.

14. The apparatus of claim 12 wherein the data plane is configured to forward all packets not received at the MCT port, and destined for a host connected to the first network device on one of the links of said first MCEC at the apparatus.

15. The apparatus of claim 12 wherein the apparatus is configured such that packets received from the MCT are forwarded only on links that are not in said first MCEC.

16. The apparatus of claim 12 wherein the apparatus is configured to prevent blocking of a port connected to the MCT during Spanning Tree Protocol (STP) operations.

17. The apparatus of claim 12 wherein one of the apparatus and the switch is designated a master switch and the other of the apparatus and the switch is designated a slave switch and wherein said first MCEC is evaluated in a Spanning Tree Protocol (STP) instance only at said master switch.

18. An apparatus for operating a first switch in communication with a second switch via a multi-chassis trunk (MCT), each of said first and second switches in communication with a first network device via one or more links and a second network device via another one or more links, the apparatus comprising:
means for creating a first Multi-Chassis EtherChannel (MCEC) comprising the one or more links connecting said first switch to the first network device and the one or more links connecting said second switch to the first network device and creating a second MCEC comprising the one or more link connecting said first switch to the second network device and the one or more links connecting said second switch to the second network device; and
means for transmitting a message from said first switch to said second switch to synchronize state for said first MCEC;
wherein said first switch comprises a control plane and a data plane operating independent from a control plane and a data plane at said second switch.

* * * * *